United States Patent
Marsden et al.

(10) Patent No.: US 10,285,552 B2
(45) Date of Patent: May 14, 2019

(54) DUST SEPARATION IN VACUUM CLEANERS

(71) Applicant: TECHTRONIC INDUSTRIES CO. LTD., Tsuen Wan, New Territories (HK)

(72) Inventors: Jennifer K. Marsden, Birmingham (GB); Gavin Burnham, Birmingham (GB); Keith Faskin, Birmingham (GB)

(73) Assignee: Techtronic Industries Co. Ltd., Tsuen Wan, New Territories (HK)

( * ) Notice: Subject to any disclaimer, the term of this patent is extended or adjusted under 35 U.S.C. 154(b) by 0 days.

(21) Appl. No.: 14/418,046

(22) PCT Filed: Aug. 8, 2013

(86) PCT No.: PCT/GB2013/052125
§ 371 (c)(1),
(2) Date: Jan. 28, 2015

(87) PCT Pub. No.: WO2014/023970
PCT Pub. Date: Feb. 13, 2014

(65) Prior Publication Data
US 2015/0257617 A1    Sep. 17, 2015

(30) Foreign Application Priority Data
Aug. 10, 2012   (GB) .................................. 1214340.0

(51) Int. Cl.
*B01D 45/00* (2006.01)
*A47L 9/16* (2006.01)
(Continued)

(52) U.S. Cl.
CPC .............. *A47L 9/1616* (2013.01); *A47L 5/362* (2013.01); *A47L 9/165* (2013.01); *A47L 9/1608* (2013.01);
(Continued)

(58) Field of Classification Search
CPC ........ A47L 9/1616; A47L 5/362; A47L 9/165; A47L 9/1625; A47L 9/1608;
(Continued)

(56) References Cited

U.S. PATENT DOCUMENTS 7,494,523 B2 * 2/2009 Oh ........................ A47L 9/1625
55/343
7,556,662 B2 * 7/2009 Lee ......................... A47L 9/122
15/353

(Continued)

FOREIGN PATENT DOCUMENTS

EP    1692993 A1 *  8/2006  ........... A47L 9/1616
EP    1692993 A1     8/2006
(Continued)

OTHER PUBLICATIONS

International Search Report and Written Opinion for Application No. PCT/GB2013/052125 dated Dec. 16, 2013 (9 pages).
(Continued)

*Primary Examiner* — Dung H Bui
(74) *Attorney, Agent, or Firm* — Michael Best & Friedrich LLP

(57) ABSTRACT

A dust separator/collector assembly for a vacuum cleaner, comprising a housing, a first cyclone having an inlet and outlet for suction airflow, and an outlet for separated dust, a plurality of second cyclones, having respective inlets arranged to receive air from the outlet of the first cyclone, and further having respective air outlets and outlets for separated further dust, wherein the first cyclone is disposed in a lower region of the housing and the second cyclones are disposed in an upper region of the housing and wherein the first cyclone comprises a generally cylindrical cyclone body having a tangential inlet duct for suction airflow at a lower part of the cyclone body, and an upwardly extending outlet
(Continued)

for suction airflow leading to the inlets of the second cyclone.

27 Claims, 7 Drawing Sheets

(51) Int. Cl.
 *B01D 45/12* (2006.01)
 *A47L 5/36* (2006.01)
 *B04C 3/04* (2006.01)
 *B04C 5/26* (2006.01)
(52) U.S. Cl.
 CPC ........... *A47L 9/1625* (2013.01); *A47L 9/1641* (2013.01); *A47L 9/1658* (2013.01); *B01D 45/12* (2013.01); *B04C 3/04* (2013.01); *B04C 5/26* (2013.01)
(58) Field of Classification Search
 CPC .... A47L 9/1641; A47L 9/1658; A47L 9/1683; B04C 3/04; B04C 5/26; B01D 45/12
 See application file for complete search history.

(56) References Cited

U.S. PATENT DOCUMENTS

| | | | |
|---|---|---|---|
| 7,744,667 B2 | 6/2010 | Oh et al. | |
| 7,776,116 B2 | 8/2010 | Oh et al. | |
| 7,951,218 B2* | 5/2011 | Oh | A47L 9/1625 15/352 |
| 2005/0252179 A1* | 11/2005 | Oh | A47L 9/1625 55/337 |
| 2006/0059871 A1* | 3/2006 | Han | A47L 9/16 55/345 |
| 2006/0230726 A1* | 10/2006 | Oh | A47L 9/1625 55/345 |
| 2007/0011998 A1* | 1/2007 | Yoo | A47L 9/1683 55/337 |
| 2007/0079474 A1 | 4/2007 | Young et al. | |
| 2007/0079586 A1* | 4/2007 | Kim | A47L 9/1608 55/345 |
| 2007/0079587 A1* | 4/2007 | Kim | A47L 9/1608 55/349 |
| 2007/0144116 A1* | 6/2007 | Hong | A47L 9/0081 55/345 |
| 2008/0184681 A1* | 8/2008 | Oh | A47L 9/1625 55/345 |
| 2010/0132316 A1* | 6/2010 | Ni | A47L 9/1625 55/343 |
| 2010/0175217 A1* | 7/2010 | Conrad | A47L 5/225 15/331 |
| 2010/0205917 A1* | 8/2010 | Oh | A47L 9/1625 55/343 |

FOREIGN PATENT DOCUMENTS

| | | |
|---|---|---|
| EP | 1707273 | 10/2006 |
| EP | 1707273 A1 | 10/2006 |
| EP | 1952744 A1 | 8/2008 |
| EP | 1958562 A2 | 8/2008 |
| EP | 1989984 A2 | 11/2008 |
| GB | 2454227 A | 5/2009 |
| WO | 2005053494 A2 | 6/2005 |

OTHER PUBLICATIONS

Search Report for GB1214340.0 dated Dec. 10, 2012 (3 pages).
Chinese Patent Office Search Report for 201380042572.X dated Feb. 23, 2016 (2 pages).
Chinese Patent Office Examination Report for 201380042572.X dated Mar. 4, 2016 with English Translation (10 pages).
United Kingdom Patent Office Examination Report for 1214340.0 dated Jan. 26, 2015 (2 pages).

* cited by examiner

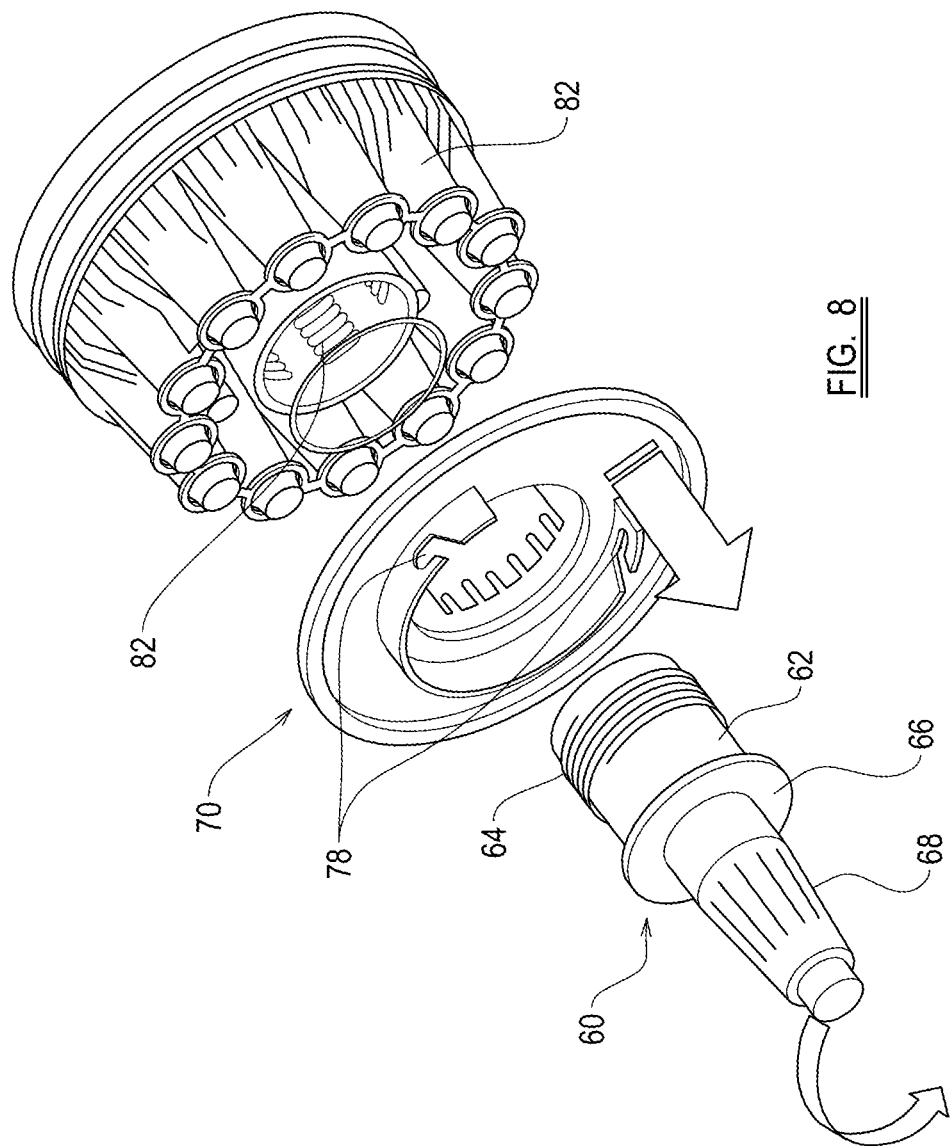

DUST SEPARATION IN VACUUM CLEANERS

BACKGROUND

This invention relates generally to suction cleaners (which are commonly, and will herein be, referred to as vacuum cleaners. More particularly, the invention relates to a dust separator/collector assembly for a vacuum cleaner, which separates dust particles from the suction airflow drawn from whatever is being cleaned, and collects the separated particles for later disposal.

In referring herein to dust, it is to be understood that what is sucked up and entrained in the suction airstream of a vacuum cleaner can typically include particles of a very wide range of sizes, ranging from microns to millimetres, possibly even tens of millimetres. Fibres, including animal and human hair, pieces of fabric or paper, and scraps or even small articles of plastics or other material are also likely to be sucked up. All such things are to be understood as included within the term "dust" used herein, and whatever system is utilised for dust separation and collection in a vacuum cleaner ought to be able to cope with a wide range of them.

SUMMARY

A dust separator/collector in accordance with the invention is one of the so-called "cyclonic" type, wherein dust is separated from the airflow by the rapid swirling motion of airflow in one or more cyclonic devices. More particularly, the dust separator/collector in accordance with the invention is a multi-cyclonic unit, including a first or primary cyclone of relatively large size, for separating coarse particles of dust and other large items from the airflow, after which the air is passed through a number of smaller cyclone devices connected in parallel with one another, in which high speed rotational airflow is effective to remove smaller dust particles from the airflow. Such "two-stage" multi-cyclone units are well known in vacuum cleaners, and many different physical arrangements of the individual cyclone units have been proposed. Whatever cyclone arrangement is adopted, the generally desirable characteristics thereof which a designer should aim for, in addition to the fundamental requirement of effective dust separation, is that the path for flow of air through the successive cyclonic stages should not be unduly tortuous and introduce inefficiencies and power losses. In addition, since sooner or later it is inevitable that something will become stuck in a cyclone or some other part of the air path, it should be relatively easy for a user to gain access to parts of the air path by partially dismantling the separator/collector assembly. Thereafter, it should be straightforward to reassemble the removed parts when any blockage has been cleared. In addition, it is desirable that, to keep manufacturing costs down as far as possible, a minimum number of components should be utilised, and they should fit together in such a way that losses and separation inefficiencies due to air leakages are avoided as far as possible.

The separator/collector assembly in accordance with the present invention has been devised with the above desiderata in mind.

According to one aspect of the invention, we provide a dust separator/collector assembly for a vacuum cleaner, comprising:
 a housing;
 a first cyclone having an inlet and outlet for suction airflow, and an outlet for separated dust;
 a plurality of second cyclones, having respective inlets arranged to receive air from the outlet of the first cyclone, and further having air outlets and outlets for separated further dust; wherein the first cyclone is disposed in a lower region of the housing and the second cyclones are disposed in an upper region of the housing; and
 wherein the first cyclone comprises a generally cylindrical cyclone body having a tangential inlet duct for dust-laden air, at a lower part of the cyclone body, and an upwardly extending outlet for suction airflow leading to the inlets of the second cyclone.

Preferably the body of the first cyclone has an outlet for separated dust at an upper part of the body, which preferably opens into a space in the house surrounding the first cyclone body.

The inlet duct of the first cyclone may extend through said space, from an aperture at the exterior of the housing.

The second cyclones may be circumferentially spaced around the interior of the upper region of the housing, while the airflow from the outlet of the first cyclones to the inlets of the second cyclones may pass through an outlet member extending centrally upwardly within part of the upper region of the housing.

The dust outlets of the second cyclones may discharge into an annular region within the housing, beneath the second cyclones and surrounding a part of the outlet member. Such an annular region may be defined between a partition formation extending transversely of the housing (e.g. moulding integrally with the housing) and a member extending transversely of the housing and supported by the outlet member.

The first cyclone may be supported by the partition member, or the transverse member.

In a separator/collector assembly in accordance with the invention, the path of airflow through it is straightforward, being predominantly upwardly within the housing from the inlet of the first cyclone to the second cyclones without any constricted regions or great changes in direction. Therefore, the requirement for avoiding losses is effectively achieved, and it will be appreciated from the following description that the construction is economical and readily assembled and dismantled as required.

BRIEF DESCRIPTION OF THE DRAWINGS

These and other features of the invention will now be described by way of example with reference to the accompanying drawings, of which:

FIG. 8 is a perspective view illustrating dismantling of part of the dust separator/collector.

DETAILED DESCRIPTION

Figure 1:
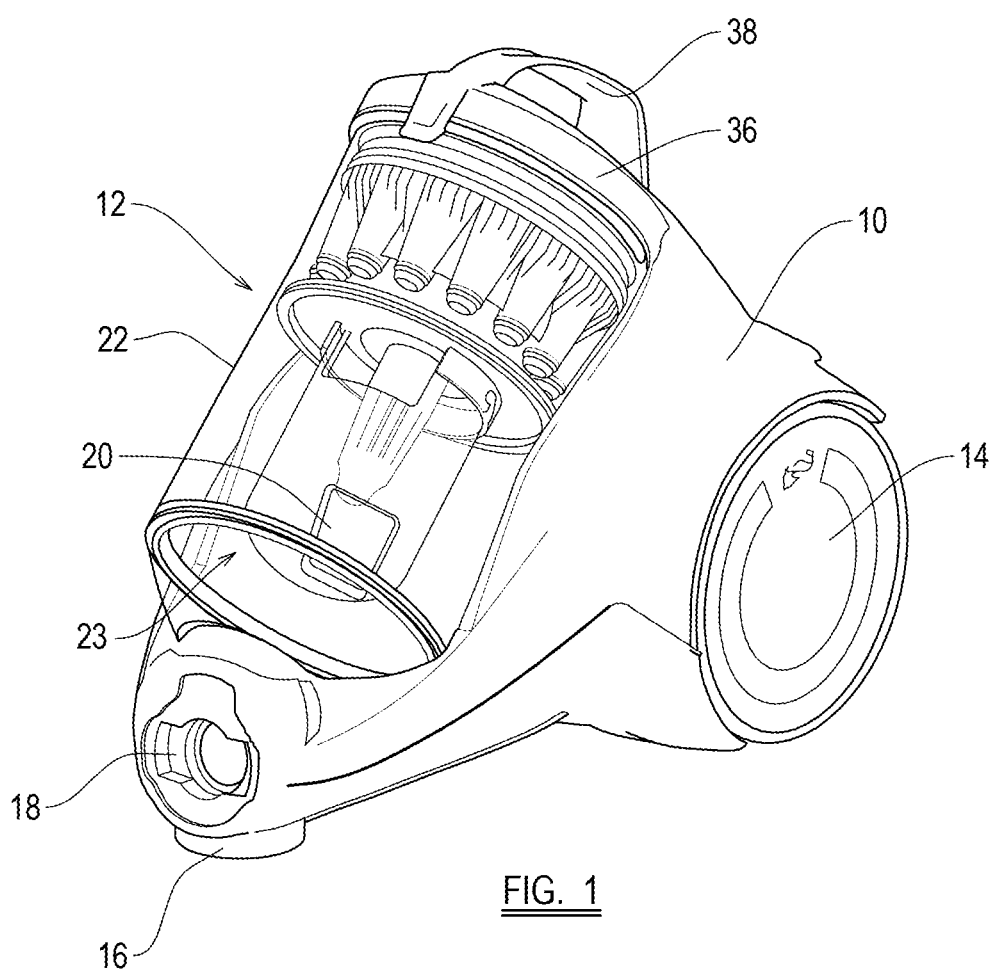
FIG. 1 is a perspective view of a vacuum cleaner provided with a dust separator/collector in accordance with the invention.

Referring firstly to FIG. 1 of the drawings, this shows a vacuum cleaner comprising a body 10 to which is detachably fitted a dust separator/collector assembly indicated generally at 12 and described in greater detail hereafter. At one end the body 10 is provided with respective wheels at each side of the body, one of the wheels being indicated at 14. At the other end, the body is fitted with a single castor wheel assembly indicated generally at 16. The body 10 houses an electric motor, a fan or impeller driven by the motor for creating a suction airflow when the motor is operating, one or more filters, possibly a cable reel for storage of an electric power cable, and any other components such as are generally well known in the field of vacuum cleaners. An airflow passage leading to an inlet of the fan or impeller extends from a formation, such as an opening in an abutment surface, which co-operates with an airflow outlet of the separator/collector assembly when it is fitted to the body of the cleaner, so that suction airflow is drawn through the separator/collector assembly from an inlet thereof to the outlet, by way of the hereafter-described components which provide for separation of dust from the suction airflow before it passes through the fan or impeller and is subsequently expelled to the exterior of the cleaner.

Above the castor wheel assembly 16 the body of the cleaner has a forward-facing fitting 18 for connection of a one end of a suction hose, whose other end is typically provided with handle to which a cleaning tool or cleaning head may be connected, possibly with the intermediary of a wand assembly. The latter may be telescopically extendible and contractible, or may comprise a number of separate sections which are able to be connected to one another as required to provide the required length of wand. From the fitting 18 an airflow duct extends to an outlet formation in the body of the cleaner, such formation being indicated at 20. The outlet 20 of the duct faces, and has leakage-resistance sealing engagement with the inlet, described hereafter, to the separator/collector 12 when fitted to the cleaner.

When in situ in the cleaner shown in the drawings, the separator/collector assembly lies at an inclination to the vertical of approximately 45°, but in the following description references to upper, lower and so forth will be used as if it were vertically oriented. It will be appreciated that in other cleaners the separator/collector assembly may be disposed at a different angle, e.g. at 0° to 90° to the vertical, although generally at an inclination between 15° and 60°.

Figure 2:
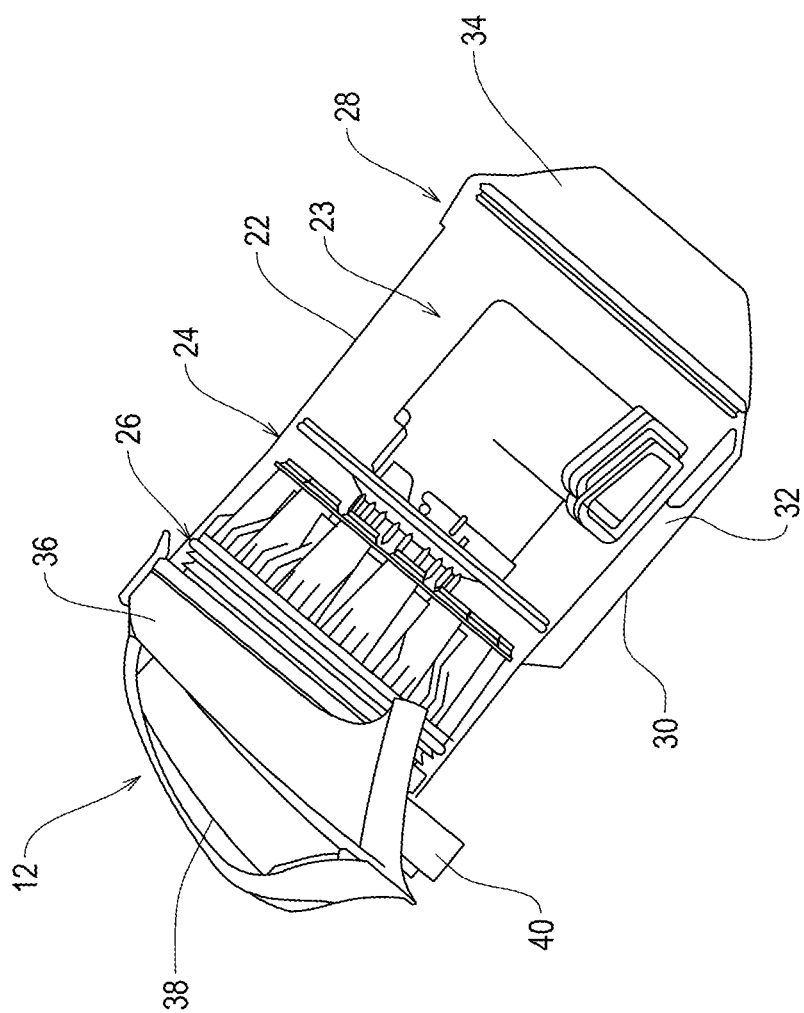
FIG. 2 is an elevation of the dust separator/collector of FIG. 1.

Referring now to FIG. 2 of the drawings this shows, in isolation, the separator/collector assembly 12. This comprises an external housing 22 which is a moulding of a transparent rigid plastics material, generally of cylindrical configuration and of a waisted profile, having a minimum external diameter in a region 24 about one third of the way down from its upper end 26 to its lower end 28, both of which are of larger diameter. From the interior of region 24, a housing portion 30 provides an external passage extending downwardly to the exterior of the lower region 28 of the housing. The space 23 within the lower part of the housing 22, and the lower end of passage 32 provided by the housing part 30, are both closed by a pivotally mounted lower cover 34 which is held in a closed position, in which it has sealing engagement with the housing parts 28, 30, by a clip or other fastener which can be manually released when the cover 34 is to be opened, for releasing separated dust from the separator. The upper end of the dust separator/collector assembly is closed by an upper cover 36 which has a handle 38 and has an airflow outlet formation 40 which co-operates with the aforementioned opening in the body leading to the fan of the cleaner.

The separator/collector assembly 12 is of the cyclonic type, comprising a number of cyclones in which flow of air in a circular motion separates entrained dust from the airflow. In known manner for vacuum cleaners, the airflow passes successively through a first or primary cyclone in which relatively large dust particles are separated from the airflow, the air leaving the primary cyclone subsequently passing through a plurality of smaller secondary cyclones connected, in airflow terms, in parallel with one another to separate any remaining smaller particles of dust from the airflow. Subsequently the airflow from the secondary cyclones passes, by way of a pre-fan filter element, to the source of the cleaner's suction.

Figure 3:
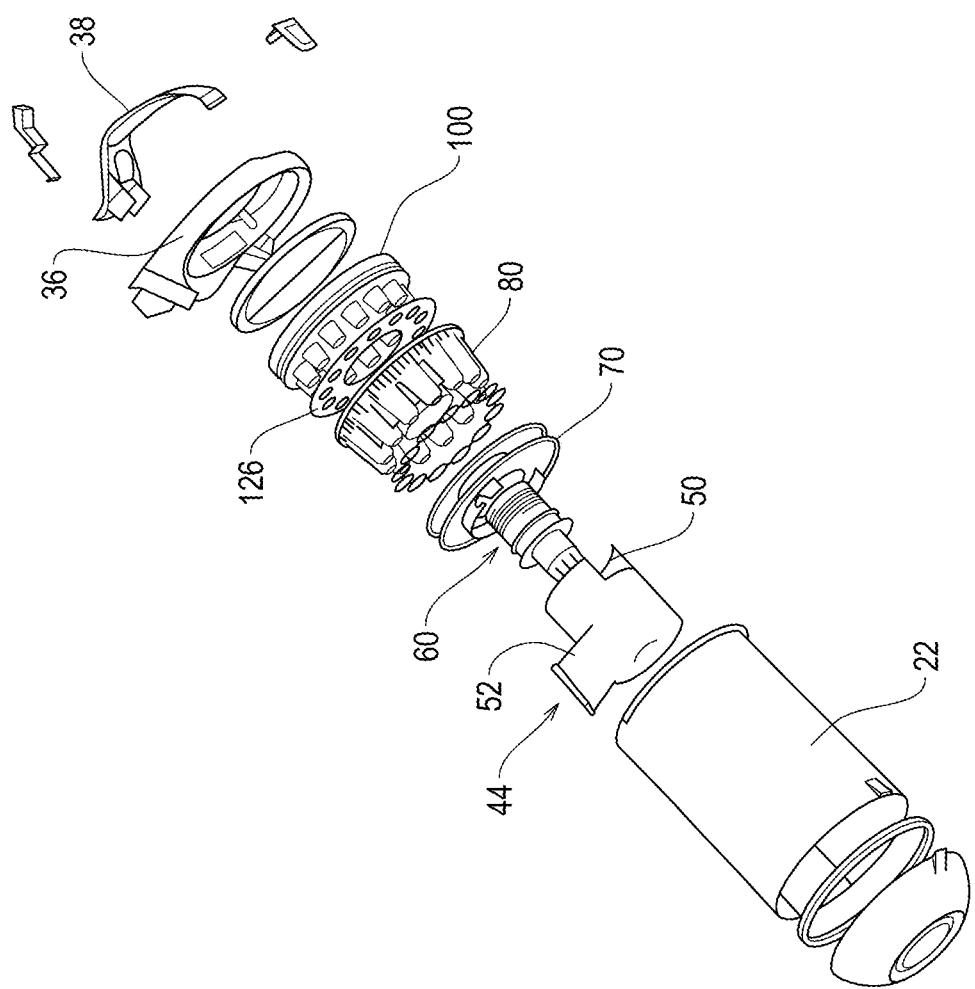
FIG. 3 is an exploded view of the dust separator/collector.
Figure 4:
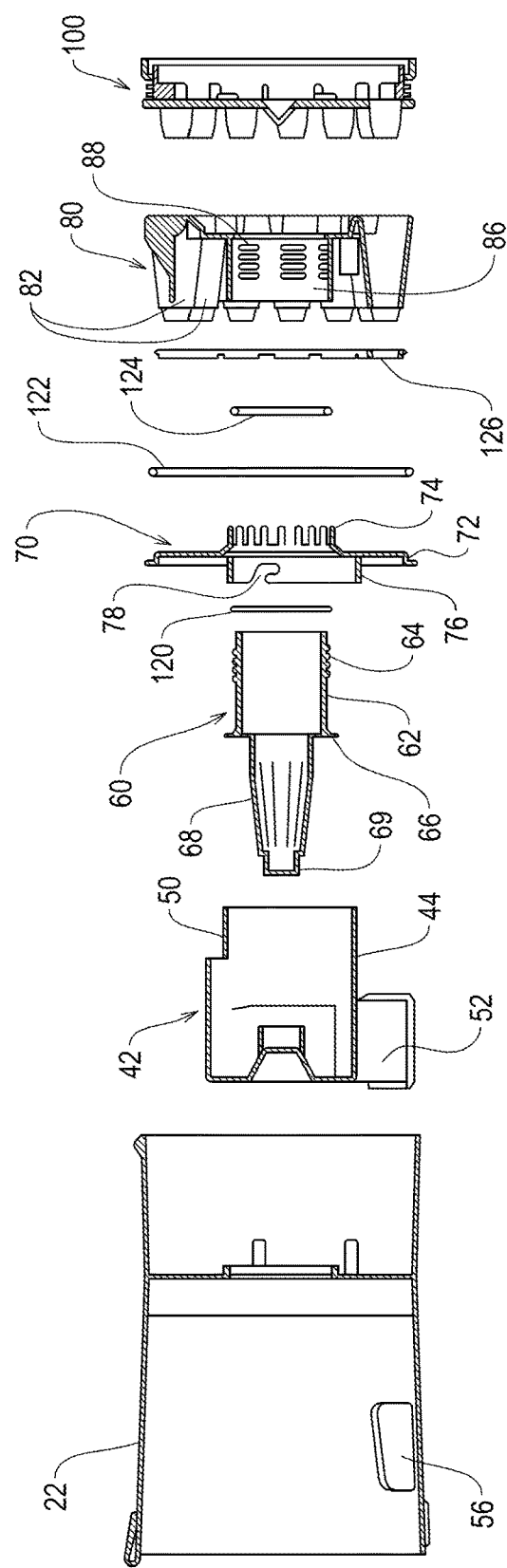
FIG. 4 is a sectional view through the individual components of the dust separator/collector.

In the present case, the components which provide the above-mentioned arrangement of cyclones are most clearly seen in FIGS. 3, 4 and the subsequent figures of drawings. Accommodated within the housing 22, there is a first cyclone 42, a component 60 which provides an outlet for airflow from the first cyclone body, a support member 70 which is generally of annular configuration, and two components 80, 100 which together form the assembly of secondary cyclones. In FIG. 4, seals, disposed as described hereafter, are indicated at 120, 122, 124, 126. The components 42, 60, 70, 80, and 100 are all mouldings of plastics material, the body of cyclone 42 being transparent to enable the user to observe its interior.

The first cyclone 42 comprises a cylindrical body 44 which is transparent as illustrated but may be translucent or opaque and of any desired colour, closed at its lower end by a wall from which a support formation 46, having a cylindrical wall 48 at its upper end, extends upwardly into the cylindrical body 44. At the upper end of the body 44, part of its circumference is provided with an opening 50 which enables separated dust to leave the cyclone body to be accumulated in the space 23 within the housing 22 surrounding the cyclone body. An air inlet duct 52 extends tangentially from the lower region of the body 44, and when the first cyclone is in situ in the housing 22 an end 54 of the inlet duct co-operates with a somewhat rectangular opening 56 in the housing 20. When the separator assembly is fitted to the cleaner, the opening 56 faces and has sealing engagement with the end of the duct leading from the hose inlet 18. Finally, the periphery of the body 44 at its open upper end is provided with outwardly extending engagement protuberances 56, whose function is described hereafter.

The outlet component 60 is generally tubular in configuration, with a cylindrical sleeve portion 62 having an external screw thread 64. At the lower end of the portion 62 there is a radially outwardly extending flange 66, followed by a tapering shroud portion 68 having circumferentially spaced slots for airflow into the interior of the component 60. The lowermost end of the shroud portion 68 is closed by a formation 69 which, in the assembled separator fits within the cylindrical wall 48 of the first cyclone body component 42.

The component 70 provides an annular partition separating the first cyclone region in the lower part of the housing 22 from the second cyclone region in the upper part of the housing. The component 70 is annular in configuration, provided on its external periphery with a stepped formation 72 for receiving the sealing ring 122. Around its central aperture, it has upwardly protruding ribs 74 and, beneath the component 70 a downwardly extending annular wall 76. The wall 76 has bayonet fastening formations for co-operating with the formations 56 on the first cyclone body 44, to secure the body 44 to the component 70 in the assembled separator.

The components 80 and 100 together make up a subassembly of secondary cyclones which are arranged in a generally annular array, spaced around the interior of the housing 22 between its position 24 of smallest diameter and its upper end region 26. The component 80 affords a plurality of cyclone bodies 82 spaced circumferentially of one another within the housing 22; each cyclone body is frusto-conical in shape with open upper and lower ends. The smaller-diameter lower end of each cyclone body protrudes slightly through a respective aperture in an annular partition formation 84 disposed transversely of the housing 22 at its smallest-diameter interior position, so that the smaller-diameter end of the respective cyclones open into an annular space defined between the partition formation 84 and the component 70 therebeneath. The external surface of the wall of each cyclone body 82 is stepped adjacent its lowermost end, to extend through a respective aperture in the seal 126 which is annular in configuration with multiple such apertures, the seal 126 being trapped between the steps in the respective cyclone walls and the partition formation 84, to ensure effective sealing between the cyclone bodies and the partition. In the space radially inwardly of the cyclone bodies of the component 80, there is a cylindrical wall formation 86 having an internal interrupted screw thread 88, for co-operation with the screw thread 64 on the exterior of the component 60 and at the upper end of wall formation 86 there is a radially outwardly extending annular surface 89.

The component 100, which fits above the component 80 in the upper end region 26 of the housing 22, affords a number of frusto-conical tubular portions 102 which extend downwardly into the respective cyclone bodies 82, to provide for outflow of air from the respective cyclone bodies. Each of the formations 102 is crossed by a vane 104, to inhibit rotational airflow within the formations 102. Radially inwardly of the formations 102, the component 100 has a wall 106 extending transversely of the housing 22, with a downwardly extending protuberance 108 of concave cone configuration facing the centre of the component 60. A space 110 is defined between the wall 106 and the surface 88 of component 80, and from this space 110 respective inlet passages 112 extend into the cyclone bodies 82 at a tangent to the latter, so that airflow entering the cyclone bodies rotates to separate dust entrained in the airflow in cyclonic manner.

Above the wall 106, the component 100 defines a space 114 which receives outflow air from the respective second cyclone bodies 82, and contains a filter element for providing a final filtration stage to ensure that no, or virtually no, particulate matter is contained in the air leaving the separator/collector assembly.

Figure 5:
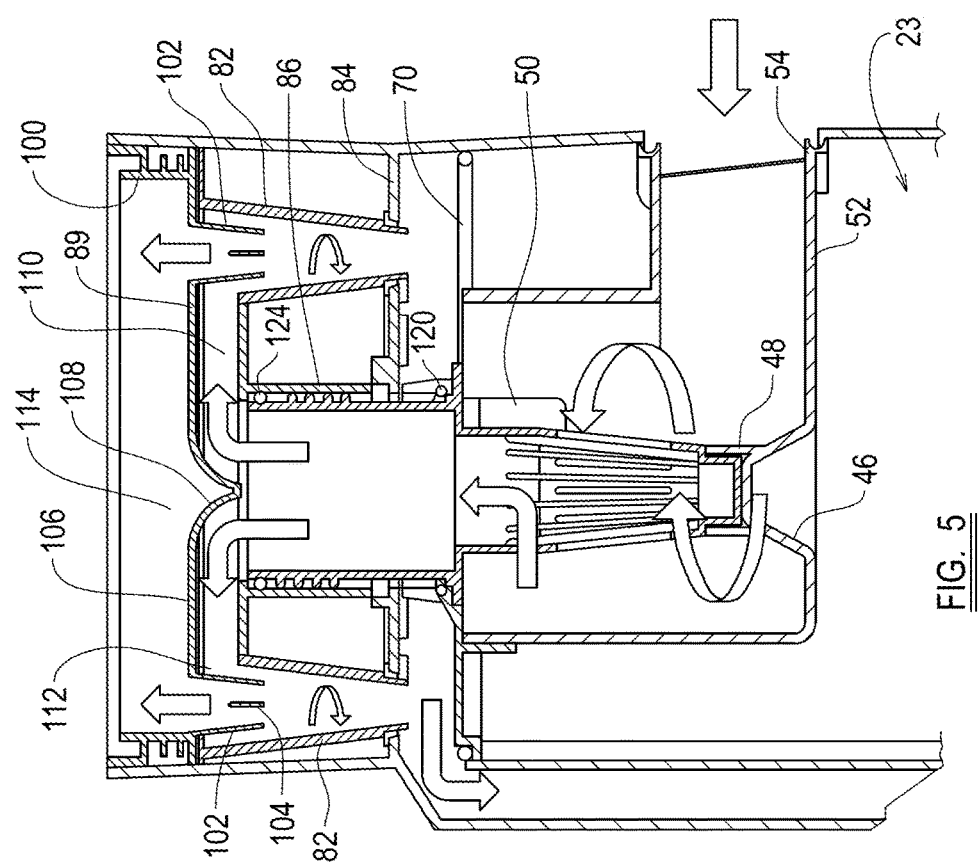
FIG. 5 is a diagrammatic section through the dust separator/collector, showing the path of airflow therethrough.
Figure 6:
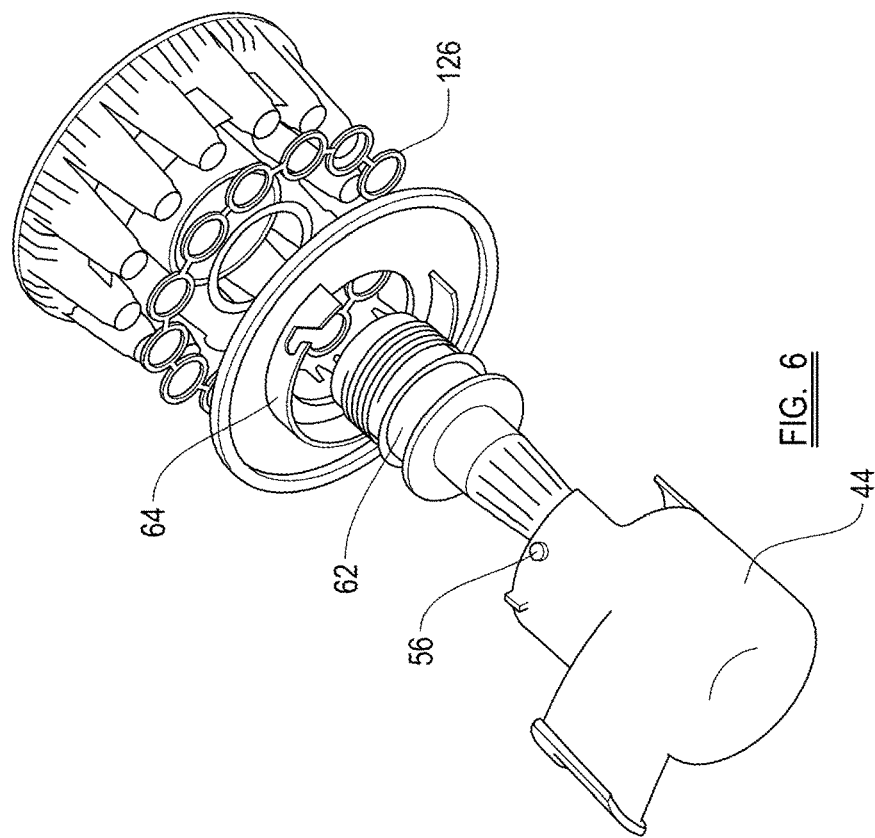
FIGS. 6 and 7 are perspective views illustrating the assembly of components of the separator/collector.
Figure 7:
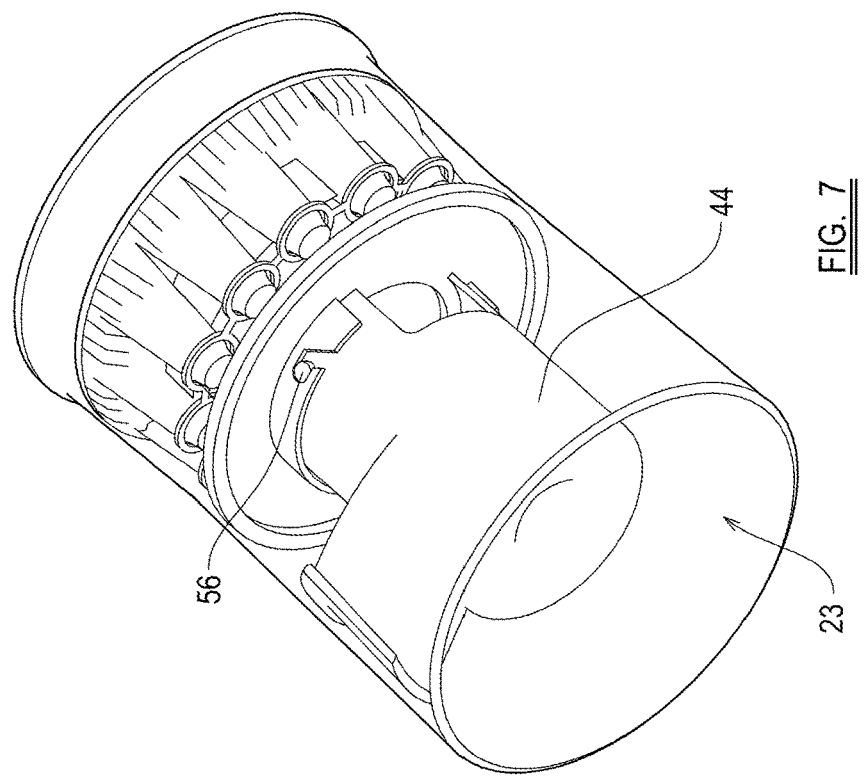

The position of seals 120, 124 in the complete separator/collector assembly is shown in FIG. 5. They provide for effective sealing between the components 60, 70 and 80 where they engage one another.

To assemble the above-described components in the dust separator/collector assembly, the component 80 is placed in the housing 22 with the seal 126 positioned so that its apertures are received on the stepped lowermost end portions of the respective cyclone bodies 82. The lowermost ends of the cyclone bodies protrude slightly through the apertures in the partition formation 84, so that the sealing member 126 is held between the cyclone bodies and the partition formation. The component 100 is then placed in the upper end of the housing 22, with its parts 122 entering the upper ends of the respective cyclone bodies.

The components 60, 70 are then placed into the housing 22 from its lower end, with the component 70 received on the part 62 of the component 60 with seal 120 interposed between the component 70 and the flange 66 of the component 60. Sealing ring 122 is positioned on the stepped peripheral region of component 70, and seal 124 positioned on the end region of part 62 of component 60, beyond the screw threaded portion 64 thereof. Then, the part 62 of component 60 is moved within the wall portion 86 of component 80 and the screw threaded parts 64, 88, engaged with one another. Rotation of component 60 draws the component 70 upwardly within the housing 22 approaching its smallest diameter part, until the components 60, 70 reach their operative position shown in FIG. 5, with the sealing elements 120, 122, 124, 126 compressed between the surfaces they contact for effective sealing.

The first cyclone body component 42 is then placed in the housing 22, again from its lower end, with the bayonet fastening formations 56, 78 on the cyclone body and component 70 engaged with one another by axial and small rotational movement of the component 44. It will be appreciated that there are co-operating formations on these components to ensure that they remain in a predetermined alignment relative to the housing 22, with the inlet 52 of the first cyclone facing the aperture 56 in the housing. The lowermost end part 69 of the component 60 fits within the annular wall 48 of the cyclone body.

Removal of components in the reverse of the above order of assembly enables cleaning of the interior spaces of the separator/collector. In particular removal of the first cyclone body 44 followed by the component 60 and then the component 70 enables cleaning of the annular space in which dust separated by the second cyclones is deposited.

The path of flow of air through the separator/collector assembly above described is as follows, and best seen with reference to FIG. 5 of the drawings. Dust-laden air from whatever is being cleaned is drawn through the suction hose of the cleaner and through the internal duct for flow of air from the hose fitting 18 to the formation 20 in the body of the cleaner, facing the inlet duct 52 of the first cyclone 42. The tangential entry of the duct 52 to the body 44 of the first cyclone causes rotational airflow within the cyclone body. Separated coarse particles of dust from that airflow within the first cyclone 42 leaves the cyclone body 44 through the opening 50 at the upper end thereof, to be accumulated in the space 23 within the housing 22 surrounding the cyclone body. Air from which the coarse dust particles have been removed leaves the first cyclone body by way of the component 60, entering the shroud portion 68 thereof through the circumferentially spaced slots therein, and flowing upwardly through the component 60 to enter the space between wall 106 and wall 88, flowing radially outwardly in that space. The air enters the second cyclone bodies 82 through the inlets 112 thereof, flowing downwardly through the cyclones rotating about the internal surface of the bodies, and causing the majority of any remaining fine dust in the air to be discharged at the open lower ends of the bodies 82. Cleaned air flows upwardly in the centre of the cyclones, and out through the formations 102 to pass through the filter within the component 100. Cleaned air passes from the separator/collector assembly by way of the exit 40 to reach the fan of the cleaner and thereby be expelled to the external atmosphere, by way of a final exhaust filter. Dust separated by the second cyclones enters the annular space between the partition formation 84 and the component 70, and passes downwardly through the passage within the external housing portion 30 to be accumulated at the lower end of the separator/collector assembly, which is closed by the cover 34.

When dust is to be emptied from the separator/collector assembly it is removed from the body of the cleaner and the lower cover 34 opened. Since the housing 22 and the first cyclone body 44 are transparent, the user can see if the quantity of collected dust is sufficient to require emptying, and also can see if any matter has become trapped in any of the parts of the separator/collector assembly. If so, the user is able to remove the first cyclone body 44, and if desired the other components as necessary, by a reverse of the assembly procedure above described.

In a possible modification of the above-described construction, the partition formation could, instead of supporting the second cyclones, provide a support directly for the first cyclone and be disposed beneath, and spaced from, a further component which together with the partition formation defines an annular space into which dust from the second cyclones is discharged. Such a further component may be supported on the outlet member 60, or carried by, or formed with, the second cyclones.

In further possible modifications, the housing 22 need not have the waisted configuration illustrated but instead be substantially cylindrical (apart from the necessary draft to enable its moulding of a plastics material). The outlet component 60 may engage the component 80 by means other than the illustrated screw thread; for example it may have bayonet engagement or be an interference or snap fit therewith.

It will be appreciated from the above description that the described separator/collector assembly provides a cost-effective construction in terms of usage of a minimal number of parts, while at the same time being relatively easy for the user to dismantle if required for the purposes of cleaning of any trapped separated dust. At the same time, the path of airflow through the separator/collector assembly is very straightforward, involving a minimum number of changes of direction and no tortuous passages, so that losses due to resistance to airflow in the separator/collector assembly are minimized.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A dust separator/collector assembly for a vacuum cleaner, comprising:
   a housing having a wall including an aperture, wherein the wall defines a dust collection chamber, the dust collection chamber configured to store dust collected by the vacuum cleaner;
   a first cyclone having an inlet for suction air flow and an outlet for suction airflow, and an outlet for separated dust;
   a plurality of second cyclones, having respective inlets arranged to receive air from the suction air flow outlet of the first cyclone, and further having respective air outlets and outlets for separated further dust;
   wherein the first cyclone is disposed in a lower region of the housing and the second cyclones are disposed in an upper region of the housing and the first cyclone is removable from the housing and the second cyclones are removable from the housing;
   and wherein the first cyclone comprises a generally cylindrical cyclone body having a tangential inlet duct for suction airflow at a lower part of the cyclone body, and an upwardly extending outlet for suction airflow leading to the inlets of the second cyclone,
   wherein the dust collection chamber is between the cyclone body and the wall of the housing,
   wherein the tangential inlet duct extends tangentially from a sidewall of the lower part of the cyclone body to the aperture; and
   wherein the tangential inlet duct is removable from the housing with the cylindrical cyclone body of the first cyclone.

2. An assembly according to claim 1 wherein the cyclone body includes a lowermost end, the tangential inlet duct extends from the sidewall adjacent to the lowermost end.

3. An assembly according to claim 1 wherein the lower-part of the cyclone body is at a lowermost end of the cyclone body.

4. An assembly according to claim 1, wherein the tangential inlet duct has a sealing engagement with the aperture.

5. An assembly according to claim 1, wherein an end of the tangential inlet duct contacts the wall of the housing and cooperates with the aperture.

6. An assembly according to claim 1, wherein the respective inlets of the plurality of second cyclones are arranged to receive air from the suction air flow outlet of the first cyclone after the air has passed through an outlet member that extends centrally upwardly within part of an upper region of the housing; and
   wherein the dust outlets of the second cyclones discharge into an annular region within the dust collection chamber of the housing beneath the second cyclones and surrounding a part of the outlet member, wherein the annular region is partially defined within the housing by a partition formation extending transversely of the housing; and wherein the annular region is further defined by a member extending transversely of the housing and supported by the outlet member, wherein the transverse member supports a body of the first cyclone; and wherein the first cyclone body has a bayonet engagement with the transverse member.

7. An assembly according to claim 6 wherein the cyclone body includes a lowermost end, the tangential inlet duct extends from the sidewall adjacent to the lowermost end.

8. An assembly according to claim 1 wherein the cyclone body of the first cyclone has the outlet for separated dust at an upper part of the cyclone body.

9. An assembly according to claim 8 wherein the outlet of the first cyclone for separated dust opens into a space in the housing surrounding the cyclone body of the first cyclone.

10. An assembly according to claim 9 wherein the tangential inlet duct of the first cyclone extends through said space from an aperture in the housing.

11. an assembly according to claim 1 wherein the second cyclones are circumferentially spaced around an interior of the upper region of the housing.

12. An assembly according to claim 11 wherein the airflow from the outlet for suction airflow of the first cyclone to the inlets of the second cyclones passes through an outlet member extending centrally upwardly within part of the upper region of the housing.

13. An assembly according to claim 12 wherein the outlet member comprises a portion which extends within the body of the first cyclone.

14. An assembly according to claim 12 wherein the outlet member has engagement with a part associated with the second cyclones.

15. An assembly according to claim 12 wherein the outlets for separated further dust of the second cyclones discharge into an annular region within the housing beneath the second cyclones and surrounding a part of the outlet member.

16. An assembly according to claim 15 wherein the housing comprises a passage extending from said annular region to a lower region of the housing for collecting dust discharged from the second cyclones.

17. An assembly according to claim 16 wherein said passage is defined at an exterior of the housing where the first cyclone is supported.

18. An assembly according to claim 15 wherein said annular region is partially defined within the housing by a partition formation extending transversely of the housing.

19. An assembly according to claim 18 wherein said partition formation is generally annular.

20. An assembly according to claim 18 wherein said partition formation supports the first cyclone.

21. An assembly according to claim 18 wherein the partition formation supports the second cyclones.

22. An assembly according to claim 21 wherein the outlets for separated further dust of the second cyclones extend into respective apertures in the partition formation.

23. An assembly according to claim 18 wherein the annular region is further defined by a member extending transversely of the housing and supported by the outlet member.

24. An assembly according to claim 23 wherein said member extending transversely of the housing supports a body of the first cyclone.

25. An assembly according to claim 24 wherein the first cyclone body has bayonet engagement with the member extending transversely of the housing.

26. An assembly according to claim 23 wherein the outlet member holds the member extending transversely of the housing in position.

27. An assembly according to claim 23, wherein said member extending transversely is disposed at or adjacent a part of the housing of minimum transverse dimension.

* * * * *